Figure 1:
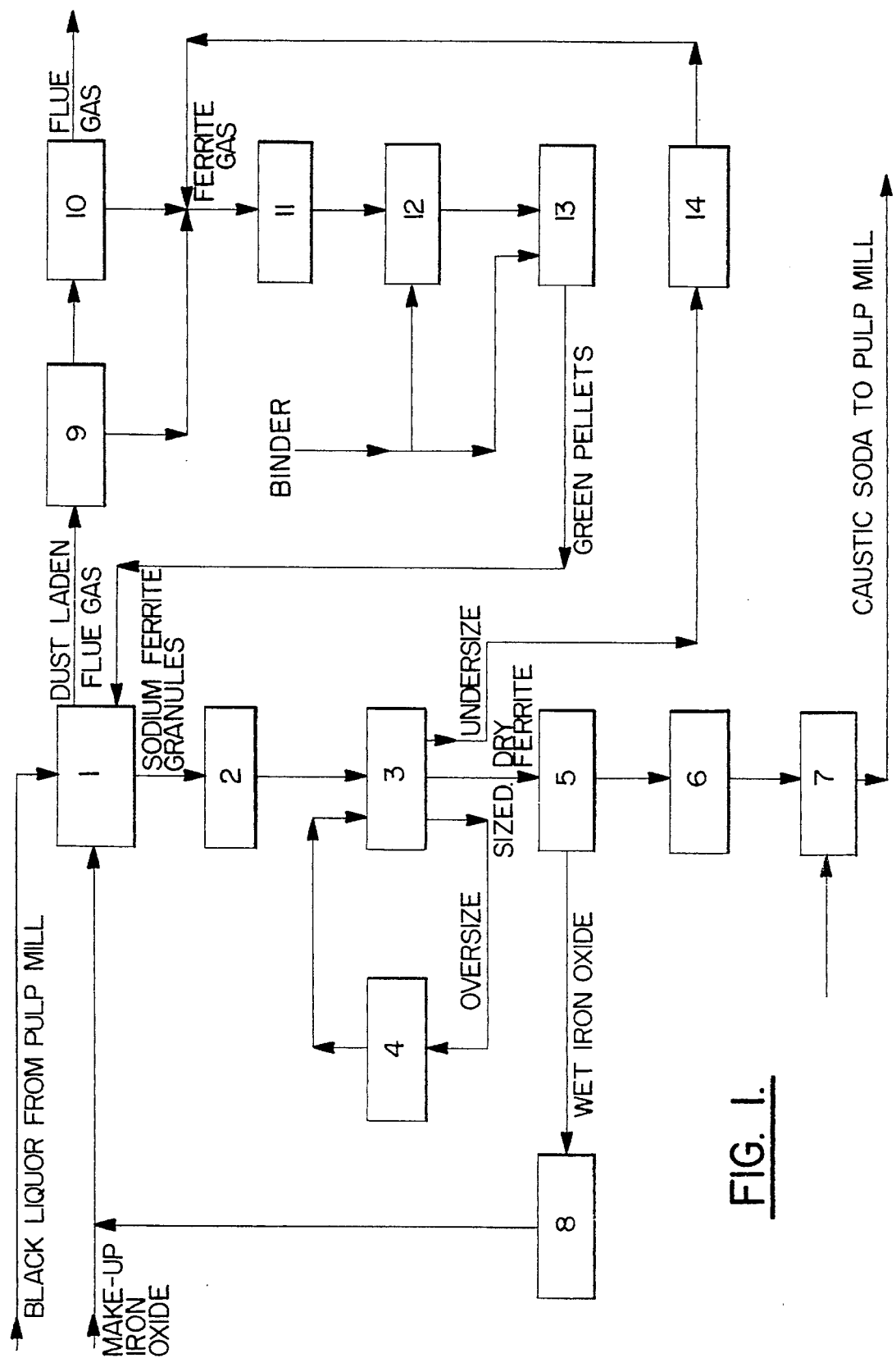

United States Patent [19]

Wunder et al.

[11] Patent Number: 5,552,099
[45] Date of Patent: Sep. 3, 1996

[54] PROCESS FOR PELLETISING PARTICLES OF ALKALI METAL FERRITE

[75] Inventors: Heiko Wunder; Robert E. Scott-Young; Kenneth N. Maddern; Jack Scukovic, all of Tasmania, Australia

[73] Assignee: Amcor Limited, South Melbourne, Australia

[21] Appl. No.: 397,144

[22] PCT Filed: Sep. 30, 1993

[86] PCT No.: PCT/AU93/00500

§ 371 Date: May 3, 1995

§ 102(e) Date: May 3, 1995

[87] PCT Pub. No.: WO94/07595

PCT Pub. Date: Apr. 14, 1994

[30] Foreign Application Priority Data

Sep. 30, 1992 [AU] Australia ................... PL5206

[51] Int. Cl.$^6$ ...................................... B29B 9/08
[52] U.S. Cl. ........................... 264/117; 23/313 P
[58] Field of Search ............... 264/37, 115, 117; 23/313 P

[56] References Cited

U.S. PATENT DOCUMENTS 4,251,475  2/1981  Varrasso .................. 23/313 P
5,460,765  10/1995  Derdall et al. ................. 264/117

FOREIGN PATENT DOCUMENTS 0223438  5/1987  European Pat. Off. .

OTHER PUBLICATIONS

Derwent On–Line Abstracts, Accession No. 80–19389C, Class E31, JP,A, 55015960 (Mitsui Shipbuilding Eng.) 4 Feb. 1980 (Apr. 2, 1980).
Derwent Abstracts, Accession No. 85–272336, Class V02, JP,A, 60183030 (Fuji Pauldal KK) Sep. 18, 1985 (Sep. 18, 1985).

*Primary Examiner*—Mary Lynn Theisen
*Attorney, Agent, or Firm*—Bell, Seltzer, Park & Gibson, P.A.

[57] ABSTRACT

The specification describes a process for pelletising particles of an alkali metal ferrite with an aqueous binder such as a black liquor derived from pulping wood chips. The particles are ground and fed to a microgranulator in measured quantities together with measured quantities of aqueous binder. The particles are ground such that they have an even size distribution about a mean in the range from 25 to 50 microns. The particles are mixed with the binder in the microgranulator to form microgranules which are fed to a pelletising pan. The temperature of the microgranules on the pelletising pan is controlled by cooling either or both the alkali metal ferrite or aqueous binder prior to measuring them into the microgranulator. A pan temperature of less than 70° C. is disclosed.

7 Claims, 1 Drawing Sheet

PROCESS FOR PELLETISING PARTICLES OF ALKALI METAL FERRITE

The present invention relates to a process for pelletising particles of an alkali metal ferrite.

Wood may be mechanically or chemically pulped. The chemical pulping processes normally employed are the sulphate, sulphite and soda pulping processes. The economics of these processes rely heavily on the recovery of chemicals employed in them.

In the sulphate process wood chips are digested in a solution of sodium hydroxide, sodium sulphide and possibly some sodium carbonate. In the sulphite process wood chips are cooked in the presence of sulphur dioxide and a bisulphite or a sulphite. In the soda process the wood chips are cooked in the presence of a solution of sodium hydroxide and possibly some sodium carbonate. The wood pulp is separated from the liquor. The liquor from the sulphate process and the soda process is normally referred to as black liquor. The present invention is concerned with the recovery of sodium hydroxide from black liquors derived from the soda process.

The specification of Australian Patent No. 486122 describes a method of recovering sodium hydroxide from black liquor which involves the following process steps:

1. concentrating the black liquor;
2. mixing ferric oxide with the condensed black liquor;
3. burning the mixture to produce sodium ferrite;
4. submerging the sodium ferrite in hot water to form sodium hydroxide and a precipitate of ferric oxide;
5. reusing the ferric oxide by mixing it with more condensed black liquor and repeating steps 3 and 4.

The specification of Australian Patent No. 519156 describes a process for recovering sodium hydroxide from black liquor which differs from the process described in Patent No. 486122 by the inclusion of a cold washing step. Sodium ferrite is washed in cold water to remove sodium chloride, sodium sulphate and other soluble impurities. The specification of Australian Patent No. 519156 also describes the use of a fluidised bed in the burning step.

The specification of Australian Patent No. 552973 describes a process similar to the process described in Australian Patent No. 519156 with the exception that it includes the step of agglomerating fines of ferric oxide and fines of sodium ferrite with black liquor before or during burning in a fluidised bed. The fines of ferric oxide are derived from the ferric oxide precipitated when sodium ferrite is added to warm water.

Normally flue gas from a fluidised bed furnace used for recovering sodium hydroxide from black liquor is laden with a dust which is typically pure sodium ferrite. It is desirable that the dust be collected, agglomerated and returned to the furnace. An aqueous binder such as black liquor differs from other agglomerating processes because the dust can chemically react exothermically with the binder and depending on the conditions, prevent agglomeration. The size and strength of the pellets produced by agglomeration of the dust also determines their subsequent utility as suitable bed material.

An object of the invention is to provide a process that is capable of agglomerating particles of sodium ferrite under plant conditions.

Accordingly, the present invention provides a process for pelletising particles of alkali metal ferrite with an aqueous binder, the process comprising:

(i) grinding the particles to form ground particles of a predetermined particle size range;

(ii) measuring controlled quantities of the ground particles and an aqueous binder into a microgranulator;

(iii) mixing the ground particles and the aqueous binder in the microgranulator to produce microgranules of alkali metal ferrite;

(iv) agglomerating the microgranules on a pelletising pan at a controlled pan temperature to produce pellets of alkali metal ferrite wherein the pan temperature is controlled by cooling either or both the particles of alkali metal ferrite or aqueous binder prior to measuring them into the microgranulator.

Preferably the particles are ground to a size having an even distribution about a mean in a range from 25 to 50 micron and more preferably 25 to 30 micron. Particles ground to this size provide pellets of optimum strength and size.

The pellet size required preferably lies in the range from 0.5 to 3 mm. If the proportion of bed material less than 0.5 mm in size increases beyond about 20%, the fluidised bed cannot be successfully operated. The finer material is prone to stick and leads to defluidisation of the bed. The fluid bed will also not accommodate more than approximately 20% oversize material as this leads to segregation and defluidisation.

The acqueous binder may be a black liquor in which case it preferably has a solids concentration in a range from 30% to 40% by weight.

An embodiment of the invention will now be described with reference to the accompanying drawing. FIG. 1 is a flow diagram illustrating a process for recovering sodium hydroxide from black liquor.

Black liquor from a pulp mill is fed to a fluidised bed furnace. The fluidised bed comprises particles of an iron rich mixed oxide of sodium and iron. Particles of haematite or magnetite may also be added as make up for iron lost in the process. The particles are fluidised by air which also provides oxygen for combustion of the organic material contained in the black liquor. The furnace is operated at a temperature of about 930° C. and a space velocity of about 0.2 meters/second above the minimum fluidisation velocity using sufficient air to maintain an excess of oxygen for burning the black liquor. Sodium ferrite granules removed from the furnace are then cooled in a cooling bed (2) to a temperature of about 160° C. The cooled particles of sodium ferrite are screened on screens (3). Oversized particles are sent to a crusher (4) and recycled back to the screen (3). Undersized particles of sodium ferrite are sent to hammer mills (14) where they are ground to a fine dust.

Sodium ferrite particles of a suitable size are fed to a counter flow leaching vessel (5). A solution of sodium hydroxide having a concentration of about 100 gms per liter or higher is fed in to one end of the leaching vessel, and a solution of sodium hydroxide having a concentration of about 300 gms per liter is withdrawn from the opposite end of the counter flow leaching vessel. Concentrated sodium hydroxide removed from the leaching vessel (5) is then centrifuged in centrifuges (6) to remove suspended oxide. Thereafter the concentrated solution of caustic soda is passed to a settling vessel (7) from which the concentrated solution of caustic soda called white liquor is returned to the pulp mill.

A slurry of mixed oxide and sodium hydroxide is extracted from the opposite end of the leaching vessel from which the concentrated solution of caustic soda is extracted. The slurry is then filtered on a belt filter (8). Filtrate recovered from the belt filter is returned to the leaching vessel (5) and the precipitate of mixed oxide is returned to the fluidised bed furnace (1).

Dust laden flue gas from the fluidised bed combustion furnace (1) is passed through boiler (9) to recover heat from the flue gas. Steam generated in boiler (9) is then used to supply process heat and power for the plant. The flue dust is essentially pure sodium ferrite which is recovered in bag house (10) on fabric filters. Dust from the bag house is mixed with dust from the hammer mill (14) and cooled in dust cooler (11). The cooled dust is then mixed with weak black liquor and micro-granulated in a pre-mixer (12). Micro-granules from the pre-mixer (12) are fed on to a pelletising pan in the pelletiser (13) where a small fraction of black liquor is added to agglomerate the granules into pellets and densify them. The pellets are then returned to the fluidised bed combustion furnace (1) where they are calcined to form granules suitable for use in the leaching circuit.

The grinding of dust to a mean size of less than 50 micron using a suitable milling process has been found to be critical to successful pelletisation.

We claim:

1. A process for pelletising particles of alkali metal ferrite with an aqueous binder, the process comprising:
   (i) grinding the particles to form ground particles of a predetermined particle size range;
   (ii) measuring controlled quantities of the ground particles and an aqueous binder into a microgranulator;
   (iii) mixing the ground particles and the aqueous binder in the microgranulator to produce microgranules of alkali metal ferrite;
   (iv) agglomerating the microgranules on a pelletising pan at a controlled pan temperature to produce pellets of alkali metal ferrite wherein the pan temperature is controlled by cooling either or both the particles of alkali metal ferrite or aqueous binder prior to measuring them into the microgranulator.

2. A process according to claim 1 wherein the aqueous binder is a black liquor derived from pulping a cellulosic material.

3. A process according to claim 1, wherein the predetermined particle size range is an even distribution about a mean in the range from 25 to 50 microns.

4. A process according to claim 1, wherein the predetermined particle size range is an even distribution about a mean in the range from 25 to 30 microns.

5. A process according to any one of the preceding claims wherein the pellets of alkali metal ferrite have a size in the range from 0.5 to 3 mm.

6. A process according to claim 1 wherein the pan temperature is maintained at a temperature below 70° C.

7. A process according to claim 2 wherein the black liquor has a solids concentration in a range from 30 to 40% by weight.

* * * * *